US010209823B2

(12) United States Patent
Zhao et al.

(10) Patent No.: US 10,209,823 B2
(45) Date of Patent: Feb. 19, 2019

(54) SMART WEARABLE DEVICE AND INFORMATION INPUT METHOD THEREOF (71) Applicant: GOERTEK INC., Weifang, Shangdong Province (CN)

(72) Inventors: Peijie Zhao, Weifang (CN); Chao Yi, Weifang (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 15/532,036

(22) PCT Filed: Jul. 14, 2016

(86) PCT No.: PCT/CN2016/089984
§ 371 (c)(1),
(2) Date: May 31, 2017

(87) PCT Pub. No.: WO2017/088500
PCT Pub. Date: Jun. 1, 2017

(65) Prior Publication Data
US 2017/0315661 A1 Nov. 2, 2017

(30) Foreign Application Priority Data
Nov. 24, 2015 (CN) .......................... 2015 1 0829214

(51) Int. Cl.
G06F 3/041 (2006.01)
G06F 3/0487 (2013.01)
(Continued)

(52) U.S. Cl.
CPC .......... G06F 3/0416 (2013.01); G04G 21/08 (2013.01); G06F 1/163 (2013.01); G06F 3/0354 (2013.01);
(Continued)

(58) Field of Classification Search
None
See application file for complete search history.

(56) References Cited

U.S. PATENT DOCUMENTS 9,651,992 B2 * 5/2017 Stotler .................... G06F 1/163
2013/0045037 A1 * 2/2013 Schaffer .................. G06F 1/163
400/472

FOREIGN PATENT DOCUMENTS

CN 103324394 A 9/2013
CN 103827781 A 5/2014
(Continued)

OTHER PUBLICATIONS

International Search Report issued in international patent application No. PCT/CN2016/089984.
(Continued)

Primary Examiner — Kenneth B Lee, Jr.
(74) Attorney, Agent, or Firm — Arent Fox LLP (57) ABSTRACT The present disclosure discloses a smart wearable device and an information input method thereof. The smart wearable device comprises a secondary touch panel located on at least one side, and a primary screen touch panel located on a front side; when the smart wearable device is in an input state, the secondary touch panel and the primary screen touch panel respectively receive touch instructions; a touch chip detects the primary screen touch panel and the secondary touch panel, obtains touch instructions, processes them and then outputs them; a microcontroller unit sets a first mapping relationship between an event of switching controls in each layer of an input method application and the touch instruction of the secondary touch panel, sets a second mapping relationship between an event of switching different layers, an input confirmation touch event, an input deletion touch event and the touch instruction of the primary screen touch panel, and implements information input based (Continued)

on the first mapping relationship, the second mapping relationship, and the touch instructions. With the secondary touch panel being in cooperation with the primary screen touch panel, the technical solution makes information input more convenient and quicker, and solves the problem about undesirable user experience upon information input on a small-sized smart wearable device.

13 Claims, 4 Drawing Sheets

(51) Int. Cl.
    *G06F 3/0354*     (2013.01)
    *G04G 21/08*     (2010.01)
    *G06F 3/0488*     (2013.01)
    *G06F 1/16*     (2006.01)

(52) U.S. Cl.
    CPC ............ *G06F 3/041* (2013.01); *G06F 3/0487* (2013.01); *G06F 3/04886* (2013.01)

(56) References Cited

FOREIGN PATENT DOCUMENTS

| CN | 204302671 U | 4/2015 |
|---|---|---|
| CN | 104866221 A | 8/2015 |
| CN | 104881219 A | 9/2015 |
| CN | 104978142 A | 10/2015 |
| CN | 105005387 A | 10/2015 |
| CN | 105487707 A | 4/2016 |
| CN | 205281403 U | 6/2016 |

OTHER PUBLICATIONS

Office Action dated Oct. 31, 2017 issued in Chinese Patent Application No. 201510829214.4.

* cited by examiner

SMART WEARABLE DEVICE AND INFORMATION INPUT METHOD THEREOF

CROSS-REFERENCE TO RELATED APPLICATIONS

This application is a National Stage entry of International Application No. PCT/CN2016/089984, filed Jul. 14, 2016, which claims priority to Chinese Patent Application No. 201510829214.4, filed Nov. 24, 2015. The disclosure of the prior application is hereby incorporated in its entirety by reference.

TECHNICAL FIELD

The present disclosure relates to the technical field of smart devices, and specifically to a smart wearable device and an information input method thereof.

BACKGROUND

At present, in the field of smart wearable devices (e.g., smart watches), since screens of the devices are smaller in size, a conventional input method does not facilitate the user's input operation. Many manufactures resort to selecting and using a voice input method. However, the voice input has many limitations on some application occasions. For example, in a noisy environment, external noise exerts an influence on accuracy of voice input, so the smart wearable device cannot accurately recognize the user's voice instruction; or during use of the smart wearable device, there are many secret-keeping settings (e.g., inputting a password for starting up a machine, inputting an Internet bank password, or the like), whereupon use of the voice input method is apt to cause leakage of important information. Hence, in the field of smart wearable devices, manual information input is still unreplaceable on some application occasions.

However, since the screen of the smart wearable device is relatively small, when the user manually inputs information on the small-sized screen of the smart wearable device, operations such as click and selection are inconvenient and are likely to cause input errors and make the user's experience undesirable.

SUMMARY OF THE DISCLOSURE

The present disclosure provides a smart wearable device and an information input method thereof to solve problems of the current smart wearable devices that the screen size is smaller, the user's information input operation is inconvenient and the user's experience is undesirable.

According to an aspect of the present disclosure, there is provided a smart wearable device which comprises a primary screen touch panel, a secondary touch panel, a touch chip and a microcontroller unit;

The secondary touch panel is disposed on a side surface of at least one side of the smart wearable device, and the primary screen touch panel is disposed on a front side of the smart wearable device;

When the smart wearable device is in an input state, the secondary touch panel and the primary screen touch panel respectively receive the user's touch instructions;

The touch chip is configured to detect the primary screen touch panel and the secondary touch panel to obtain touch instructions and respectively process the touch instructions and then send them to the microcontroller unit;

The microcontroller unit is configured to set a first mapping relationship between a touch event of switching controls in each layer of an input method application and a touch instruction of the secondary touch panel; and set a second mapping relationship between a touch event of switching different layers of the input method application, an input confirmation touch event, an input deletion touch event and a touch instruction of the primary screen touch panel; and implement information input of the smart wearable device based on the first mapping relationship, the received touch instruction of the secondary touch panel, and the second mapping relationship, and the received touch instruction of the primary screen touch panel.

According to another aspect of the present disclosure, there is provided an information input method of a smart wearable device. A front side of the smart wearable device is provided with a primary screen touch panel, and at least one side surface is provided with a secondary touch panel; when the smart wearable device is in an input state, the information input method comprises:

using the secondary touch panel to receive a first touch instruction input by the user, and using the primary screen touch panel to receive a second touch instruction input by the user;

detecting the primary screen touch panel and the secondary touch panel, obtaining the first touch instruction and the second touch instruction, processing the first touch instruction and the second touch instruction, and then outputting them;

setting a first mapping relationship between a touch event of switching controls in each layer of an input method application and a first touch instruction; and setting a second mapping relationship between a touch event of switching different layers of the input method application, an input conformation touch event, an input deletion touch event and a second touch instruction of the primary screen touch panel; implementing the information input of the smart wearable device based on the first mapping relationship, the received touch instruction of the secondary touch panel, and the second mapping relationship and the received touch instruction of the primary screen touch panel.

Advantageous effects of the present disclosure are as follows: in the technical solutions of the embodiments of the present disclosure, the secondary touch panel is disposed on at least one side surface of the smart wearable device, the primary screen touch panel is disposed on the front side, the first mapping relationship between an event of switching controls in each layer of the input method application and a touch instruction of the secondary touch panel is set, and the second mapping relationship between a touch event of switching different layers, an input conformation touch event, an input deletion touch event and a touch instruction of the primary screen touch panel is set; then, corresponding information input is implemented using the first mapping relationship and the second mapping relationship when the touch instruction of the primary screen touch panel or the secondary touch panel is received. As such, the primary screen touch panel and the secondary touch panel share the work and cooperate with each other, and they respectively receive the user's touch instructions. In this way, the touch function of the primary screen touch panel is extended, limitations of the size of the screen of the smart wearable device is broken through, misoperation issue caused upon information input only through the primary screen touch panel is avoided, and the user's experience is improved.

BRIEF DESCRIPTION OF THE DRAWINGS

FIG. 4 is a schematic diagram of selecting an input character group in an input layer corresponding to an English input type identifier control as shown in FIG. 3a;

DETAILED DESCRIPTION

An inventive concept of the present disclosure is as follows: with respect to problems of the smart wearable devices in the prior art such as smaller screen size, inconvenient manual information input operation, possible misoperations and undesirable user experience, information input of the smart wearable device is implemented by disposing a secondary touch panel on at least one side of the smart wearable device, enabling the secondary touch panel to share partial information input function, and then cooperating with an information input function of a primary screen touch panel. In this way are solved problems that misoperations might occur when information is input on the small-sized screen of the smart wearable device, operations such as clicking and sliding are inconvenient, and the user's experience is undesirable. In addition, after the technical solutions of embodiments of the present disclosure are applied, the screen of the smart wearable device may remain in the current small size or may be designed in a smaller size, thereby satisfying demands for diverse designs of screens of smart wearable devices and improving competitiveness of the product.

Figure 1A:
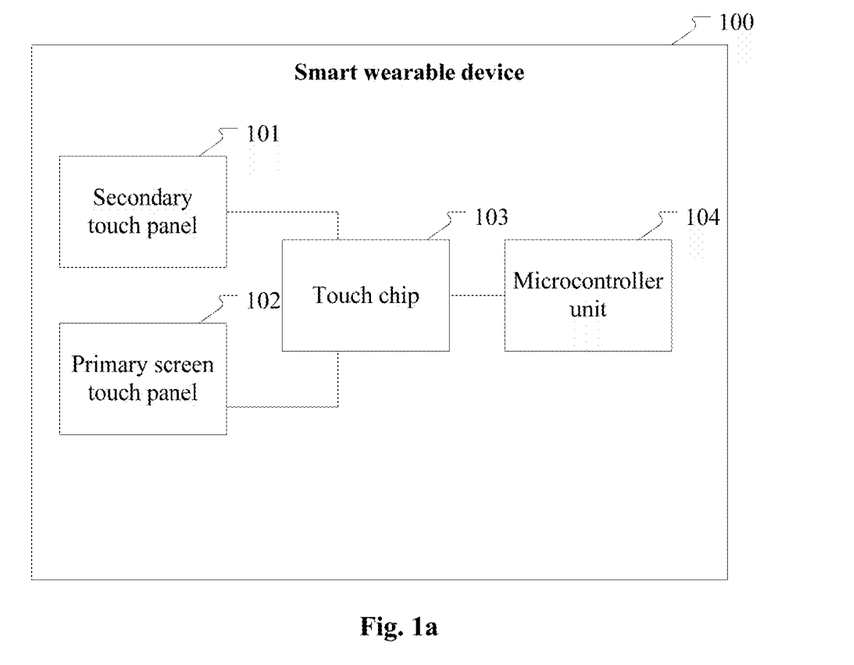
FIG. 1a is a block diagram of a smart wearable device according to an embodiment of the present disclosure.

FIG. 1a is a block diagram of a smart wearable device according to an embodiment of the present disclosure. Referring to FIG. 1a, in an embodiment of the present disclosure, the smart wearable device 100 comprises: a primary screen touch panel 102, a secondary touch panel 101, a touch chip 103 and a microcontroller unit 104;

The secondary touch panel 101 is disposed on a side surface of at least one side of the smart wearable device 100, and the primary screen touch panel 102 is disposed on a front side of the smart wearable device 100;

When the smart wearable device 100 is in an input state, the secondary touch panel 101 and the primary screen touch panel 102 respectively receive the user's touch instructions;

The touch chip 103 is configured to detect the primary screen touch panel 102 and the secondary touch panel 101 to obtain touch instructions and respectively process the touch instructions and then send processed touch instructions to the microcontroller unit 104;

The microcontroller unit 104 is configured to set a first mapping relationship between a touch event of switching controls in each layer of an input method application and a touch instruction of the secondary touch panel 101; and set a second mapping relationship between a touch event of switching different layers of the input method application, an input confirmation touch event, an input deletion touch event and a touch instruction of the primary screen touch panel 102; and implement information input of the smart wearable device 100 based on the first mapping relationship, the received touch instruction of the secondary touch panel 101, the second mapping relationship, and the received touch instruction of the primary screen touch panel 102.

Figure 1B:
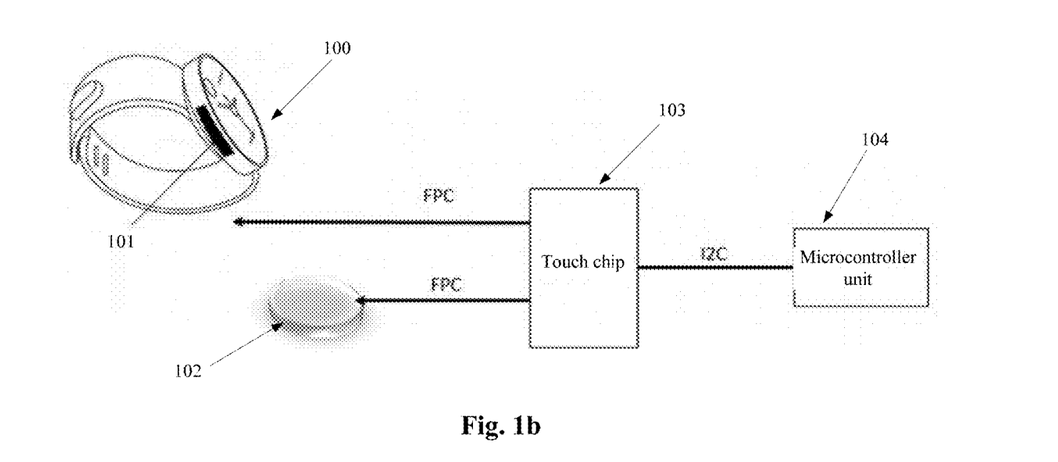
FIG. 1b is a schematic diagram of an application setting of a smart wearable device according to an embodiment of the present disclosure.

FIG. 1b is a schematic diagram of an application setting of a smart wearable device according to an embodiment of the present disclosure. In conjunction with FIG. 1a and FIG. 1b, in the present embodiment, the smart wearable device 100 is a smart watch. Both the primary screen touch panel 102 and the secondary touch panel 101 are connected with the touch chip 103; the touch chip 103 is connected with the microcontroller unit 104 via an I2C bus; the secondary touch panel 101 comprises a flexible printed circuit (FPC) board (as shown in FIG. 1b) on which a plurality of series-connected metal electrodes are disposed, with parasitic capacitors being connected between respective metal electrodes; a parasitic capacitor is further connected with an output pin of the touch chip 103. Since in the actual application setting, the secondary touch panel is disposed on a side surface of at least one side of the smart wearable device, then the size of the secondary touch panel is not too large. Preferably, in the present embodiment, the flexible printed circuit board is provided with four metal electrodes which already can satisfy the needs for accurately detecting positions of touch points. The flexible printed circuit board with a plastic member being glued (the plastic member here may be Polyamid eP, shortly PA) thereto is embedded in a side portion of a watch face housing of the smart watch 100.

On the smart wearable device 100 shown in FIG. 1a and FIG. 1b are provided the primary screen touch panel 102 and the secondary touch panel 101 which are jointly connected to the same touch chip 103. Since the size of the screen of the current smart wearable device is limited, disposing the secondary touch panel on the side and sharing partial input function means extending the space of the primary screen touch panel, and the primary screen touch panel cooperates with the secondary touch panel on the side to jointly implement information input, thereby solving problems in the prior art such as small size of the screen of the smart wearable device, inconvenient manual input operation and easily misoperations, thus optimizing the user's experience in use, and improving the competitiveness of the smart wearable device.

The function of the input method of this smart wearable device in the present embodiment is implemented in the following procedure: many applications are set in the smart wearable device, an input method interface will pop up when the user uses the smart wearable device and opens some applications, the input method application corresponds to a virtual keyboard, and a keyboard key-pressing monitoring program monitors keyboard operations in real time. Each click operation of the user on the primary screen touch panel or each sliding operation on the secondary touch panel generates touch information via the touch chip, and the touch chip transmits the touch information to the microcontroller unit (MCU) via the I2C interface.

An Input Method Manager (IMM) is a bridge connecting the input method program with other application programs.

The IMM includes a UI control, a user interface (abbreviated as UI) of the input method conforms to a tiered structure, and position information of keys on each tier stores in the UI control. When the keyboard key-pressing monitoring program monitors occurrence of a key-pressing operation, triggered position information is converted by the UI control into a key-pressing message. Meanwhile, the application program (e.g., a dialing application program, short message application program or the like on the smart wearable device) informs the system via the IMM. These key-pressing messages will be transmitted to an Input Method Editor (shortly IME) through an input method interface. After receiving the key-pressing messages, the Input Method Manager invokes a logic function to calculate for the key-pressing messages, converts the key-pressing messages into character messages or command messages, and transmits the character messages to the Input Method Manager IMM so that they are displayed in the input interface of the application program; the command messages are transmitted to the input method program to perform switching, confirmation and return of the input method interface and so on.

Figure 2:
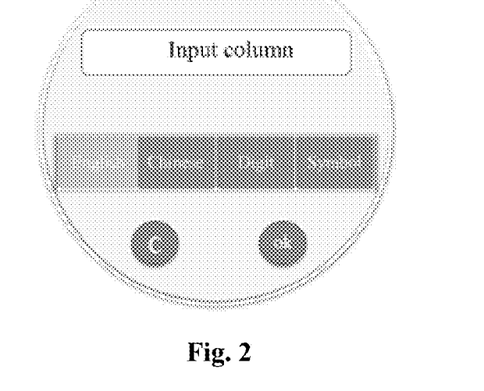
FIG. 2 is a schematic diagram showing the switching of controls in an initial layer of an input method application of the smart wearable device according to an embodiment of the present disclosure.

FIG. 2 is a schematic diagram showing the switching of controls in an initial layer of an input method application in a smart wearable device according to an embodiment of the present disclosure. Referring to FIG. 2, in the present embodiment, an input column control, an input type identifier control and a control widget are provided in the initial layer of the input method application;

Specifically, the input type identifier control comprises: an English input identifier control, a Chinese input identifier control, a digital input identifier control and a symbol input identifier control so that the user selects a specific input type.

It needs to be appreciated that the symbol input identifier control shown in FIG. 2 is a special symbol input identifier control.

When the smart wearable device is in an initial input state, what is first activated by the input method application is the initial layer, and the initial layer is provided with a plurality of controls shown in FIG. 2. In response to the user's sliding operation, the secondary touch panel disposed on a side of the smart wearable device (namely a side Touch) generates a sliding touch instruction. The touch chip connected with the secondary touch panel detects the secondary touch panel in real time, obtains the sliding touch instruction on the secondary touch panel, processes the sliding touch instruction and then sends the processed sliding touch instruction to the microcontroller unit (MCU). The MCU receives the sliding touch instruction sent from the touch chip, and switches between different input type identifier controls on the initial layer of the input method application based on the first mapping relationship already set in the MCU. The first mapping relationship here may be: implementing an event of selecting and switching different controls in the same input layer based on a sliding touch instruction of the secondary touch panel.

Referring to FIG. 2, in the present embodiment, the user selects a certain input type identifier control through the sliding touch instruction of the secondary touch panel. Then, the MCU, based on the first mapping relationship and the received sliding touch instruction, changes the user interface display information of the selected input type identifier control in the current layer of the input method application to prompt the user of the currently-selected input type identifier.

In the present embodiment, the MCU sets the display information of the input type identifier control selected by the user to be highlighted to display it prominently. In other embodiments, the display information may be set in other forms, which are not limited herein.

Referring to FIG. 2, the control widget comprises: a confirmation widget and a return widget; the microcontroller unit, based on the second mapping relationship and a received click touch instruction for the confirmation widget, confirms successful trigger of the input type identifier control selected by the sliding touch instruction of the secondary touch panel, and activates an input layer corresponding to the input type identifier control; or, based on the second mapping relationship and a received click touch instruction for the return widget, retreats out of the initial layer of the input method application. The initial layer of the input method application is provided with the confirmation widget (namely, key ok) and the return widget (namely, key C). After the input type identifier control is selected, the primary screen touch panel generates the click touch instruction in response to the user's click operation. The touch chip detects the primary screen touch panel in real time, obtains the click touch instruction, processes the click touch instruction and then transmits the processed click touch instruction to the MCU.

In the present embodiment, the click touch instruction may be the click touch instruction of the confirmation widget or the click touch instruction of the return widget. The MCU implements corresponding operations based on the second mapping relationship and the specific click touch instruction. The second mapping relationship here may be a mapping relationship between an input confirmation event of the input method application or a touch event of switching different layers of the input method application and aclick touch instruction of the primary screen touch panel.

Specifically, when the primary screen touch panel generates the click touch instruction of the confirmation widget in response to the user's click operation, the MCU controls to confirm successful trigger of the selected input type identifier control in the current layer, and activates and enters an input layer corresponding to the input type identifier control. When the primary screen touch panel generates the click touch instruction of the return widget in response to the user's click operation, the MCU controls to retreat out of the current layer of the input method application.

In other embodiments of the present disclosure, the click touch instruction for the return widget may further implement the switching between different layers of the input method application, which will be described below in detail. Since illustration is presented by taking the initial layer of the input method application as an example here, when the user clicks the return widget on the primary screen touch panel, a corresponding operation is retreating out of the initial layer of the input method application.

Figure 3A:
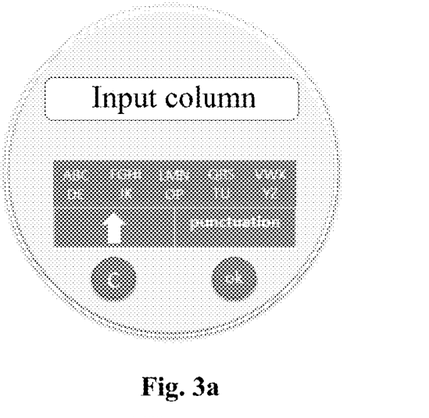
FIGS. 3a-3d are schematic diagrams of input layers corresponding to input type identifier controls in the initial layer of the input method application as shown in FIG. 2.
Figure 3B:
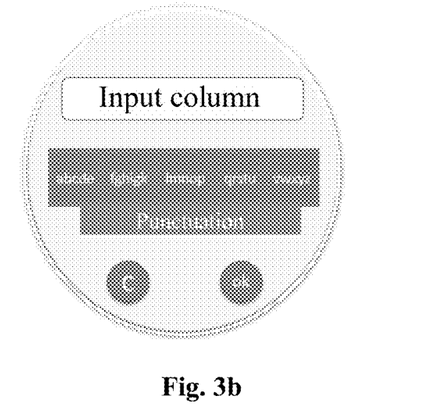
Figure 3C:
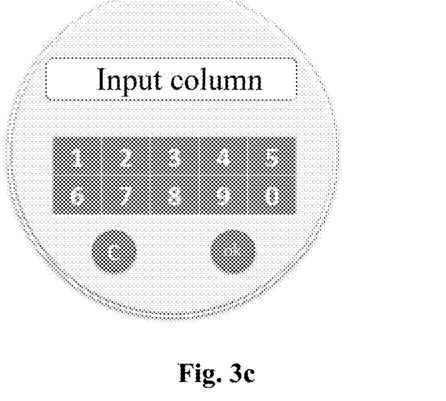
Figure 3D:
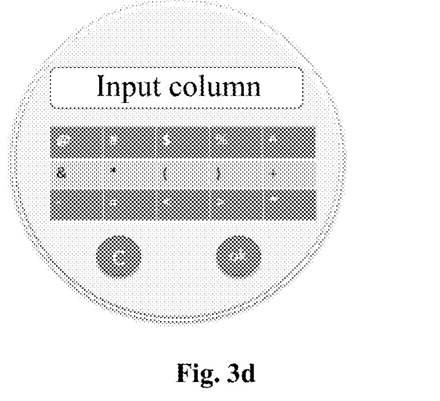

FIGS. 3a-3d are schematic diagrams of input layers corresponding to input type identifier controls in the initial layer of the input method application as shown in FIG. 2, wherein FIG. 3a represents an input layer corresponding to an English input identifier control, FIG. 3b represents an input layer corresponding to a Chinese input identifier control, FIG. 3c represents an input layer corresponding to a digital input identifier control, and FIG. 3d represents an input layer of a special symbol input identifier control.

As can be seen from FIG. 3a to FIG. 3d, there are a plurality of input character controls in a corresponding input layer under each input type identifier control to facilitate performance of sliding selection.

The following, the function of the thus-structured smart wearable device according to the embodiment of the present disclosure will be described in detail by taking one procedure of inputting information content(inputting the letter "L") as an example.

Referring to FIG. 2 and FIG. 3a, upon entry into the input layer shown in FIG. 2, the secondary touch panel receives the input sliding touch instruction and selects the English input identifier control, and the MCU highlights the English input identifier control and activates entry into the input layer corresponding to the English input identifier control. After entry into the input layer corresponding to the English input identifier control (namely, the input layer as shown in FIG. 3a), the secondary touch panel generates the sliding touch instruction in response to the user's sliding operation. The MCU selects and switches between the plurality of input character controls in the current layer bases on the first mapping relationship and the sliding touch instruction.

Figure 4:
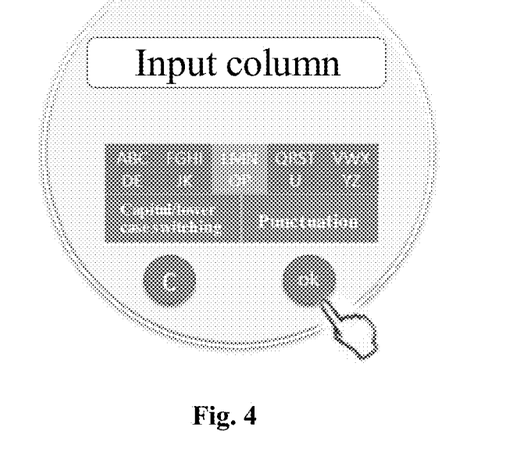

FIG. 4 is a schematic diagram of selecting input characters in an input layer corresponding to the English input type identifier control as shown in FIG. 3a. Referring to FIG. 4, the secondary touch panel generates the sliding touch instruction in response to the user's sliding operation; the touch chip detects the secondary touch panel, obtains the sliding touch instruction, processes it and then sends the processed sliding touch instruction to the MCU, and the MCU selects and switches between different input character controls based on the first mapping relationship.

The input layer corresponding to the English input identifier control comprises: an input character control, an input column control and a control widget. Specifically, the input character control is presented in the form of a character group control, that is to say, in the input layer shown in FIG. 4, a character group is stored in each input character control, for example, the highlighted input character control selected by the user currently is provided with a group of characters "LMNOP". A layer corresponding to a single character control is provided correspondingly under the input layer corresponding to each character group control to thereby reduce occupation of the size of the screen of the smart wearable device and reduce limitations to the size of the screen.

As known from FIG. 4 and FIG. 3, the input method application of the smart wearable device in the present embodiment employs a tiered structure, implements the switching of different controls of the same layer based on the sliding operation of the secondary touch panel, and implements, through the click operation on the primary screen touch panel, switching operations between different layers, input confirmation operations and input deletion operations of the input method application. Specifically, selection in the same layer is implemented via the secondary touch panel (namely, side Touch), the confirmation key ok indicates confirmation of entry into next layer, and the return key C indicates return to the preceding layer; the initial layer of the input method application is provided with several input types, switching between different input types is implemented by sliding the side Touch, and the confirmation key ok is clicked through the primary screen touch panel to enter a certain large class (input type); then, character group controls are provided in each large class; for example, 26 English letters may be divided into four or five character group controls; likewise, a corresponding character group control is selected by sliding the side Touch, and the confirmation key ok is clicked for confirmation; after entry into the layer corresponding to the character group control, a single character control to be input is clicked. The input method application with such tiered structure and the solution about cooperation of the primary screen touch panel and the secondary screen panel ensure that the size of the screen of the smart wearable device may be designed smaller and solve the problem of easily misoperations upon information input on the small-sized screen.

In addition, referring to FIG. 4, the input layer corresponding to the English input identifier control is further provided with a capital/lower case switching control and a punctuation mark control to satisfy the user's input information needs.

Referring to FIG. 4, after the user selects the input layer corresponding to the input character control where the characters "LMNOP" on the current layer lie, the primary screen touch panel generates the click touch instruction in response to the user's click operation. The touch chip detects the primary screen touch panel in real time, obtains the click touch instruction, processes the click touch instruction and then transmits the processed click touch instruction to the MCU. The MCU performs corresponding operations based on the second mapping relationship and the received click touch instruction.

For example, when the click touch instruction generated by the primary screen touch panel based on the user's click operation is the click touch instruction for the confirmation widget (namely, key ok), the MCU confirms successful trigger of the input character control (namely, the input character control where LMNOP lies) selected by the sliding touch instruction of the secondary touch panel, and activates an input layer corresponding to the input character control. When the click touch instruction generated by the primary screen touch panel based on the user's click operation is the click touch instruction for the return widget (namely, key C), the MCU controls the input method application to return to the input layer shown in FIG. 3a so that the input method application switches from the input layer corresponding to the character group control to the input layer corresponding to the input type identifier control. That is to say, the click touch instruction of the return widget generated by the primary screen touch panel implements switching events between different layers of the input method application.

In the present embodiment, further illustration is provided by taking the user's click of the ok control on the primary screen touch panel shown in FIG. 4 as an example. MCU confirms successful trigger of the input character control selected by the touch instruction of the secondary touch panel, and enters an input layer corresponding to the input character control.

Figure 5:
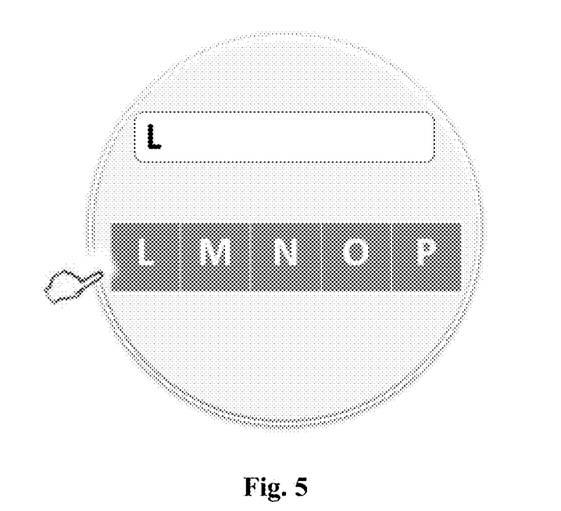
FIG. 5 is a schematic diagram of selecting a single input character in the input layer corresponding to an input character group control as shown in FIG. 4.

FIG. 5 is a schematic diagram of selecting a single character in the input layer corresponding to the input character control as shown in FIG. 4; in conjunction with FIG. 4 and FIG. 5, in the input layer shown in FIG. 4, 26 English letters are divided into five character groups, and the side Touch is slid to perform switching between the character groups of the English input interface. The highlighted character group in FIG. 4 is a selected item. Slide the side Touch to a corresponding character group and then click the confirmation widget ok, and then enter the input layer shown in FIG. 5. After entering the input layer shown in FIG. 5, the user clicks a character "L" and sends the character "L" to an input box to display the input character. In the event of failure to receive the letter clicked by the user or it is found that the letter to be input is not in the current input layer, it is feasible to receive the user's sliding operation of sliding the side Touch to return to the layer shown in FIG. 4. After returning to the layer shown in FIG. 4, the user may slide the side Touch to select the capital/lower case switching control and click the confirmation widget ok. The input method application will convert the capital/lower case mode to input a corresponding capital/lower case character.

Referring to FIG. 5, different from FIG. 4 and FIG. 3a, FIG. 5 is a schematic diagram of the last input layer of one input procedure of the input method application. In the input layer, the primary screen touch panel generates the click touch instruction in response to the user's click operation (e.g., click the control where the character "L" lies), and the MCU, based on the click touch instruction of the primary screen touch panel, sends a single input character selected by the user to the input column control for display, thereby completing the input of the character "L". In this input method layer, it is only necessary to receive the user's click operation through the primary screen touch panel, and the sliding operation of the side touch panel is omitted; the MCU, based on the second mapping relationship, confirms successful trigger of a single character selected by the click touch instruction of the primary screen touch panel and it is unnecessary to set the control widget.

Noticeably, in the embodiment of the present disclosure, to keep the interface beautiful and consider needs of actual use, the last input layer of the input method application is only provided with a single input character control and an input column control, not with the return widget (namely, the return key C) for returning to the preceding layer, and instead, the function of returning to the preceding input layer is implemented by establishing a third mapping relationship between an input layer switching event and a sliding touch instruction of the secondary touch panel.

Referring to FIG. 5, in the current layer as shown in FIG. 5, when other characters needs to be further input upon completion of input of a character, the secondary touch panel generates a sliding touch instruction in response to the user's sliding operation, and the MCU, based on the received sliding touch instruction of the secondary touch panel and the third mapping relationship, returns to the input layer (namely, the input layer as shown in FIG. 4) corresponding to the character group control, and then subsequently responds to the user's operation of re-selecting the character group control.

Through the above procedure, the smart wearable device simply and quickly completes input of the character "L". Then, the deletion operation of the input content is described below.

During the information input of the smart wearable device, there often occur occasions on which the input content is wrong and needs to be deleted. At this time, the primary screen touch panel responds to the user's click touch instruction, and the MCU executes the deletion operation of the input content based on the received click touch instruction and the second mapping relationship.

Figure 6:
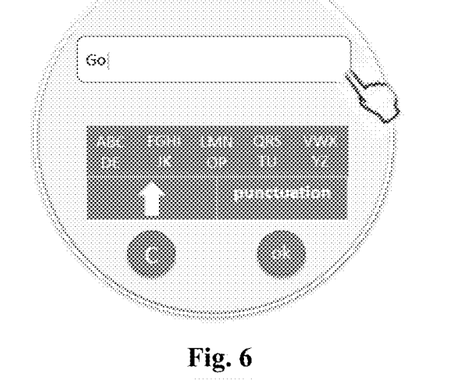
FIG. 6 is a schematic diagram of input content provided by an embodiment of the present disclosure.
Figure 7:
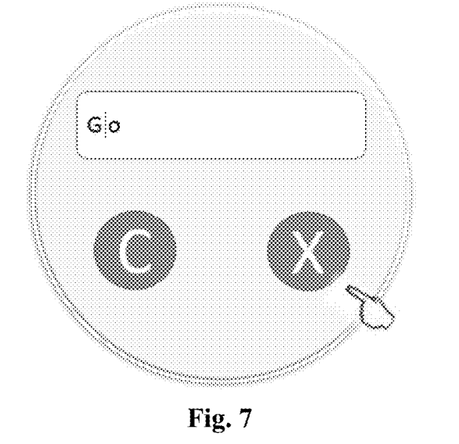
FIG. 7 is a schematic diagram of deletion of the input content as shown in FIG. 6 according to an embodiment of the present disclosure.

FIG. 6 is a schematic diagram of input content provided by an embodiment of the present disclosure, and FIG. 7 is a schematic diagram of deletion of the input content as shown in FIG. 6.

In the present embodiment, implementing the information input of the smart wearable device based on the first mapping relationship, the received touch instruction of the secondary touch panel, and the second mapping relationship and the received touch instruction of the primary screen touch panel comprises: executing the deletion operation of the input content based on the touch instruction of the primary screen touch panel and the second mapping relationship.

In conjunction with FIG. 6 and FIG. 7, the input column control of the current layer of the input method application displays input content "Go". The primary screen touch panel receives the click touch instruction of the user clicking the input column control, and the MCU, based on the click touch instruction of the primary screen touch panel and the second mapping relationship, activates the layer corresponding to an input content deletion event (namely, the layer shown in FIG. 7); after entry into the layer shown in FIG. 7, the secondary touch panel generates the sliding touch instruction in response to the user's sliding operation; the MCU, based on the received sliding touch instruction, controls a cursor to move along with the sliding touch instruction of the secondary touch panel to select input content to be deleted; when the cursor moves to the input content to be deleted, the primary screen touch panel responds to the user's click touch instruction (namely, a touch instruction of clicking the deletion control "x") and deletes the selected input content in accordance with the click touch instruction and the second mapping relationship. As such, the deletion operation of the input content is completed.

Referring to FIG. 7, a return widget and a deletion control are provided in the layer of the input method deletion operation in FIG. 7. After completion of the deletion operation of the input content, the primary screen touch panel may be configured to return to the preceding tier of the input method in response to the touch instruction of the user clicking the return widget "C". In other embodiments of the present disclosure, the effect of returning to the preceding tier of the input method is achieved through the secondary touch panel in response to the user's sliding touch instruction, and in accordance with the sliding touch instruction and the third mapping relationship between the sliding touch instruction stored in the microcontroller unit and the event of returning to the preceding tier.

As known from the above, as compared with the voice input method, manual information input is adapted for a larger scope. The technical solution of the embodiment of the present disclosure has advantages of manual information input. In addition, with the secondary touch panel being provided in cooperation with the primary screen touch panel, the information input of the smart wearable device of the present embodiment is simpler and quicker than the current manual information input, misoperation issues caused by the conventional information input to the smart wearable device with a small-sized screen are solved, and the user's experience is optimized.

Figure 8:
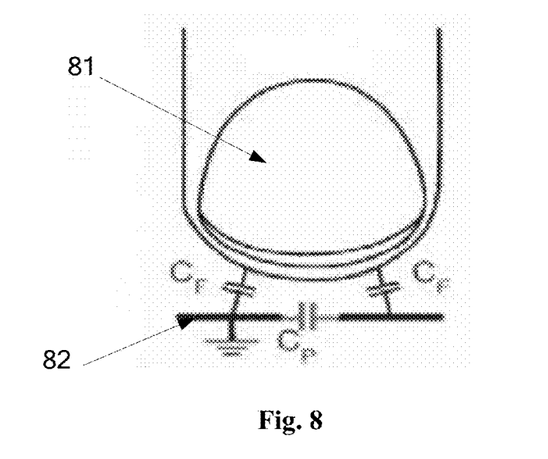
FIG. 8 is a schematic diagram of a working principle of a secondary touch panel according to an embodiment of the present disclosure.

FIG. 8 is a schematic diagram of a working principle of a secondary touch panel according to an embodiment of the present disclosure. Referring to FIG. 8, in the present embodiment, a hardware circuit of the smart wearable device comprises: four metal electrodes 82 (only two metal electrodes are shown in FIG. 8) are disposed on the Flexible Printed Circuit (FPC) circuit, and the metal electrodes 82 are connected by a parasitic capacitor (namely, capacitor Cp). When a finger 81 slides on the secondary touch panel, coupling capacitance is generated between the finger and the metal electrodes so that a capacitance value of the capacitor Cp changes. The capacitance is connected in parallel to the ground via the human body. As the capacitance value of the capacitor Cp changes, electrical current at a receiving terminal of the touch chip varies with the capacitance value. At this time, the touch chip performs signal conversion processing, converts the changes of the electrical current into corresponding digital signals and then transmits them to the microcontroller unit MCU through the I2C interface.

In addition, embodiments of the present disclosure further provide an information input method of the smart wearable device. A front side of the smart wearable device is provided with a primary screen touch panel, and at least one side surface is provided with a secondary touch panel; when the smart wearable device is in an input state, the information input method comprises:

using the secondary touch panel to receive a first touch instruction input by the user, and using the primary screen touch panel to receive a second touch instruction input by the user;

detecting the primary screen touch panel and the secondary touch panel, obtaining the first touch instruction and the second touch instruction, processing the first touch instruction and the second touch instruction, and then outputting the processed first and second touch instructions;

setting a first mapping relationship between a touch event of switching controls in each layer of an input method application and a first touch instruction; and setting a second mapping relationship between a touch event of switching different layers of the input method application, an input conformation touch event, an input deletion touch event and a second touch instruction of the primary screen touch panel; implementing the information input of the smart wearable device based on the first mapping relationship, the received touch instruction of the secondary touch panel, and the second mapping relationship and the received touch instruction of the primary screen touch panel.

In the present embodiment, implementing the information input of the smart wearable device based on the first mapping relationship, the received touch instruction of the secondary touch panel, and the second mapping relationship and the received touch instruction of the primary screen touch panel comprises:

selecting a control in each layer of the input method application based on the first mapping relationship and the received first touch instruction; and based on the second touch instruction and the second mapping relationship, confirming successful trigger of the control selected by the first touch instruction, and activating an input layer corresponding to the control;

or executing a deletion operation of the input content based on the second touch instruction and the second mapping relationship.

In the present embodiment, using the secondary touch panel to receive the first touch instruction input by the user, and using the primary screen touch panel to receive the second touch instruction input by the user comprises: using the secondary touch panel to generate a first sliding touch instruction in response to the user's sliding operation; using the primary screen touch panel to generate a second click touch instruction in response to the user's click operation.

In the present embodiment, an initial layer of the input method application of the smart wearable device is provided with a plurality of input type identifier controls and control widgets;

The input type identifier controls comprise: a Chinese input identifier control, an English input identifier control, a digital input identifier control and a special symbol input identifier control;

The control widgets comprise: a confirmation widget and a return widget;

Implementing the information input of the smart wearable device based on the first mapping relationship, the received touch instruction of the secondary touch panel, and the second mapping relationship and the received touch instruction of the primary screen touch panel comprises:

based on the first mapping relationship and the first sliding touch instruction, changing user interface display information of the selected input type identifier control in the current layer of the input method application, to prompt the user of the currently-selected input type identifier;

based on the second mapping relationship and a click touch instruction for the confirmation widget, confirming successful trigger of the input type identifier control selected by the first sliding touch instruction, and activating an input layer corresponding to the input type identifier control;

or, based on the second mapping relationship and a click touch instruction for the return widget, retreating out of the initial layer of the input method application.

In the present embodiment, the input layer corresponding to each input type identifier control is provided with an input column control and an input character control;

selecting the input character control in the input layer corresponding to each input type identifier control based on the first mapping relationship and the first sliding touch instruction;

and, based on the second mapping relationship and the second click touch instruction, confirming successful trigger of the input character control selected by the first sliding touch instruction, and sending the selected character to the input column control.

In the present embodiment, the input character control comprises: an input character group control and a single input character control;

The information input method further comprises: setting a third mapping relationship between a touch event of switching different layers of the input method application and a first sliding touch instruction;

based on the third mapping relationship and the first sliding touch instruction, activating an input layer corresponding to the character group control so that the input method application is switched from an input layer corresponding to the single character control to the input layer corresponding to the character group control.

It needs to be noted that the information input method of the smart wearable device in the present embodiment is adapted for the smart wearable device in the above-mentioned embodiments, and steps of implementing the information input method of the present embodiment may refer to the above depictions of the above-mentioned smart wearable device, which will not be detailed here.

To conclude, in the technical solution of the embodiments of the present disclosure, the primary screen touch panel is disposed on the front side, the secondary touch panel is disposed on at least one side surface, the first mapping relationship between an event of switching controls in each layer of the input method application and a touch instruction of the secondary touch panel is set, and the second mapping relationship between a touch event of switching different layers, an input conformation touch event, an input deletion touch event and a touch instruction of the primary screen touch panel is set; corresponding information input is implemented based on the first mapping relationship and the second mapping relationship when the touch instruction of the primary screen touch panel or the secondary touch panel is received. As such, the primary screen touch panel and the secondary touch panel share the work and cooperate with each other, and they respectively receive the user's touch instructions, for example, the secondary touch panel receives the touch instruction of the control selected by the user in the same layer of the input method application, and the primary screen touch panel receives the touch instruction confirmed by the user for the selected control. In this way, the touch function of the primary screen touch panel is extended, limitations of the size of the primary screen of the smart wearable device are broken through, misoperation issues caused upon information input only through the primary screen touch panel are avoided, and the user's experience is improved.

What are described above are only preferred embodiments of the present disclosure and not intended to limit the present disclosure. Any modifications, equivalent substitutions and improvements made within the spirit and principle of the present disclosure all should be included in the protection scope of the present disclosure.

What is claimed is:

1. A smart wearable device, wherein the smart wearable device comprises a primary screen touch panel, a secondary touch panel, a touch chip and a microcontroller unit;
   the secondary touch panel is disposed on a side surface of at least one side of the smart wearable device, and the primary screen touch panel is disposed on a front side of the smart wearable device;
   when the smart wearable device is in an input state, the secondary touch panel and the primary screen touch panel respectively receive the user's touch instructions;
   the touch chip is configured to detect the primary screen touch panel and the secondary touch panel to obtain the touch instructions and respectively process the touch instructions and then send them to the microcontroller unit;
   the microcontroller unit is configured to set a first mapping relationship between a touch event of switching controls in each layer of an input method application and a touch instruction of the secondary touch panel; and set a second mapping relationship between a touch event of switching different layers of the input method application, an input confirmation touch event, an input deletion touch event and a touch instruction of the primary screen touch panel; wherein the input method application employs a tiered structure;
   select a control in each layer of the input method application based on the first mapping relationship and the received touch instruction of the secondary touch panel, so as to implement the switching of different controls of the same layer; and
   confirm successful trigger of a control selected by the touch instruction of the secondary touch panel, and activate an input layer corresponding to the control based on the second mapping relationship and the received touch instruction of the primary screen touch panel, or, execute a deletion operation of the input content based on the second mapping relationship and the received touch instruction of the primary screen touch panel, so as to implement switching operations between different layers, input confirmation operations and input deletion operations.

2. The smart wearable device according to claim 1, wherein,
   the secondary touch panel generates a sliding touch instruction in response to the user's sliding operation;
   the primary screen touch panel generates a click touch instruction in response to the user's click operation.

3. The smart wearable device according to claim 2, wherein, an initial layer of the input method application of the smart wearable device is provided with a plurality of input type identifier controls and control widgets;
   the input type identifier controls comprise: a Chinese input identifier control, an English input identifier control, a digital input identifier control and a special symbol input identifier control;
   the microcontroller unit, based on the first mapping relationship and the received sliding touch instruction of the secondary touch panel, changes user interface display information of the selected input type identifier control in the current layer of the input method application, to prompt the user of the currently-selected input type identifier.

4. The smart wearable device according to claim 3; wherein, the control widget comprises: a confirmation widget and a return widget;
   the microcontroller unit, based on the second mapping relationship and a received click touch instruction for the confirmation widget, confirms successful trigger of the input type identifier control selected by the sliding touch instruction of the secondary touch panel, and activates an input layer corresponding to the input type identified control;
   or, based on the second mapping relationship and a received click touch instruction for the return widget, retreats out of the initial layer of the input method application.

5. The smart wearable device according to claim 4, wherein, the input layer corresponding to said each input type identifier control is provided with an input column control and an input character control
   the microcontroller unit selects an input character control in the input layer corresponding to each input type identifier control based on the first mapping relationship and the received sliding touch instruction of the secondary touch panel; and
   the microcontroller unit, based on the second mapping relationship and the received click touch instruction of the primary screen touch panel, confirms successful trigger of the input character control selected by the sliding touch instruction of the secondary touch panel, and sends the selected character to the input column control.

6. The smart wearable device according to claim 5, wherein, the input character control comprises: a character group control and a single character control;
   the microcontroller unit further sets a third mapping relationship between a touch event of switching different layers of the input method application and the sliding touch instruction of the secondary touch panel;
   the microcontroller unit, based on the third mapping relationship and the received sliding touch instruction of the secondary touch panel, activates an input layer corresponding to the character group control so that the input method application is switched from an input layer corresponding to the single character control to the input layer corresponding to the character group control.

7. The smart wearable device according to claim 1, wherein, both the primary screen touch panel and the secondary touch panel are connected with the touch chip;
   the touch chip is connected with the microcontroller unit via an I2C bus;
   the secondary touch panel comprises a flexible printed circuit board on which a plurality of series-connected metal electrodes are disposed, with a parasitic capacitor being connected between respective metal electrodes;
   the parasitic capacitor is further connected with an output pin of the touch chip.

8. The smart wearable device according to claim 7, wherein, the smart wearable device is a smart watch;
   the flexible circuit board is provided with four metal electrodes, and the flexible printed circuit board with a plastic member being glued thereto is embedded in a side portion of a watch face housing of the smart watch.

9. An information input method of a smart wearable device, wherein a front side of the smart wearable device is provided with a primary screen touch panel, and at least one side surface is provided with a secondary touch panel; when the smart wearable device is in an input state, the information input method comprises:
  using the secondary touch panel to receive a first touch instruction input by the user, and using the primary screen touch panel to receive a second touch instruction input by the user;
  detecting the primary screen touch panel and the secondary touch panel, obtaining the first touch instruction and the second touch instruction, processing the first touch instruction and the second touch instruction, and then outputting them respectively;
  setting a first mapping relationship between a touch event of switching controls in each layer of an input method application and a first touch instruction; and setting a second mapping relationship between a touch event of switching different layers of the input method application, an input conformation touch event, an input deletion touch event and a second touch instruction of the primary screen touch panel; wherein the input method application employs a tiered structure;
  selecting a control in each layer of the input method application based on the first mapping relationship and the received touch instruction of the secondary touch panel, so as to implement the switching of different controls of the same layer; and
  confirming successful trigger of a control selected by the touch instruction of the secondary touch panel, and activating an input layer corresponding to the control based on the second mapping relationship and the received touch instruction of the primary screen touch panel, or, executing a deletion operation of the input content based on the second mapping relationship and the touch instruction of the primary screen touch panel, so as to implement switching operations between different layers, input confirmation operations and input deletion operations.

10. The information input method according to claim 9, wherein the using the secondary touch panel to receive a first touch instruction input by the user, and using the primary screen touch panel to receive a second touch instruction input by the user comprises:
  using the secondary touch panel to generate a first sliding touch instruction in response to the user's sliding operation;
  using the primary screen touch panel to generate a second click touch instruction in response to the user's click operation.

11. The information input method according to claim 10, wherein an initial layer of the input method application is provided with a plurality of input type identifier controls and control widgets;
  the input type identifier controls comprise: a Chinese input identifier control, an English input identifier control, a digital input identifier control and a special symbol input identifier control;
  the control widgets comprise: a confirmation widget and a return widget; selecting a control in each layer of the input method application based on the first mapping relationship and the received touch instruction of the secondary touch panel comprises:
  based on the first mapping relationship and the received touch instruction of the secondary touch panel, changing user interface display information of the selected input type identifier control in the current layer of the input method application to prompt the user of the currently-selected input type identifier;
  confirming successful trigger of a control selected by the touch instruction of the secondary touch panel, and activating an input layer corresponding to the control based on the second mapping relationship and the received touch instruction of the primary screen touch panel, comprises:
  based on the second mapping relationship and a click touch instruction for the confirmation widget, confirming successful trigger of the input type identifier control selected by the sliding touch instruction of the secondary touch panel, and activating an input layer corresponding to the input type identifier control;
  or, based on the second mapping relationship and a received click touch instruction for the return widget, retreating out of the initial layer of the input method application.

12. The information input method according to claim 11, wherein the input layer corresponding to each input type identifier control is provided with an input column control and an input character control;
  selecting a control in each layer of the input method application based on the first mapping relationship and the received touch instruction of the secondary touch panel, comprises:
  selecting the input character control in the input layer corresponding to each input type identifier control based on the first mapping relationship and the received sliding touch instruction of the secondary touch panel; and,
  confirming successful trigger of a control selected by the touch instruction of the secondary touch panel, and activating an input layer corresponding to the control based on the second mapping relationship and the received touch instruction of the primary screen touch panel, comprises:
  based on the second mapping relationship and the received click touch instruction of the primary screen touch panel, confirming successful trigger of the input character control selected by the sliding touch instruction of the secondary touch panel, and sending the selected character to the input column control.

13. The information input method according to claim 12, wherein, the input character control comprises: an input character group control and a single character control;
  the information input method further comprises: setting a third mapping relationship between a touch event of switching different layers of the input method application and the first sliding touch instruction of the secondary touch panel;
  based on the third mapping relationship and the first sliding touch instruction, activating an input layer corresponding to the character group control so that the input method application is switched from an input layer corresponding to the single character control to the input layer corresponding to the character group control.

* * * * *